(12) United States Patent
Zhang et al.

(10) Patent No.: US 8,514,813 B2
(45) Date of Patent: Aug. 20, 2013

(54) METHOD AND MOBILE MANAGEMENT ENTITY FOR OBTAINING BEARER CONDITION DURING HANDOVER OF USER EQUIPMENT

(75) Inventors: Juan Zhang, Beijing (CN); Haijing Hu, Beijing (CN); Yihua Jiang, Beijing (CN); Ying Wang, Shenzhen (CN)

(73) Assignee: China Academy of Telecommunications Technology, Beijing (CN)

( * ) Notice: Subject to any disclaimer, the term of this patent is extended or adjusted under 35 U.S.C. 154(b) by 214 days.

(21) Appl. No.: 13/012,121

(22) Filed: Jan. 24, 2011

(65) Prior Publication Data

US 2011/0116478 A1  May 19, 2011

Related U.S. Application Data

(63) Continuation of application No. PCT/CN2009/072872, filed on Jul. 22, 2009.

(30) Foreign Application Priority Data

Jul. 24, 2008 (CN) .......................... 2008 1 0117145

(51) Int. Cl.
  *H04W 36/00* (2009.01)
  *H04W 4/00* (2009.01)
(52) U.S. Cl.
  USPC ......................................... 370/331; 370/329
(58) Field of Classification Search
  USPC ............................................................ 370/331
  See application file for complete search history.

(56) References Cited

U.S. PATENT DOCUMENTS

| 6,728,365 | B1 | 4/2004 | Li et al. |
| 2005/0201324 | A1 | 9/2005 | Zheng |
| 2009/0086705 | A1* | 4/2009 | Zisimopoulos et al. ...... 370/347 |
| 2009/0238207 | A1* | 9/2009 | Zhao et al. .................... 370/468 |
| 2009/0245108 | A1* | 10/2009 | Wu et al. ....................... 370/233 |
| 2009/0316656 | A1* | 12/2009 | Zhao et al. .................... 370/331 |
| 2011/0275377 | A1* | 11/2011 | Wu et al. ....................... 455/436 |
| 2012/0165018 | A1* | 6/2012 | Zhao et al. .................... 455/436 |

FOREIGN PATENT DOCUMENTS

CN      101001446A A     7/2007

OTHER PUBLICATIONS

3GPP, General Packet Radio Service (GPRS) enhancements for Evolved Universal Terrestrial Radio Access Network (E-UTRAN) access, Dec. 2007, 3GPP TS 23.401 V8.0.0, pp. 1-167.*
3GPP, General Packet Radio Service (GPRS) enhancements for Evolved Universal Terrestrial Radio Access Network (E-UTRAN) access, Dec. 2007, T3GPP TS 23.401 V8.0.0, pp. 1-167.* 3GPP, TSG SA WG2 Meeting # 65 S2-04350. May 12-16, 2008.*
Official Action for Chinese Application No. 2008101845175, dated May 25, 2011.
Official Action for Korean Application No. 10-2011-7003133, dated Mar. 27, 2012.

* cited by examiner

*Primary Examiner* — Brandon Renner
*Assistant Examiner* — Faisal Choudhury
(74) *Attorney, Agent, or Firm* — Marshall, Gerstein & Borun LLP

(57) ABSTRACT

The present invention provides a method for obtaining bearer condition during a handover of UE. The method includes: receiving, by a mobile management entity (MME), information of at least one bearer allowed to be accepted by a target base station (eNB) when the eNB makes an admission control for a UE based on received bearer information of the UE during handover of the UE; updating, by the MME, a UE-AMBR used by the target eNB based on the received at least one bearer. The present invention also provides an MME which enables the target side obtain actual bearer condition during handover of a UE.

8 Claims, 4 Drawing Sheets

METHOD AND MOBILE MANAGEMENT ENTITY FOR OBTAINING BEARER CONDITION DURING HANDOVER OF USER EQUIPMENT

CROSS-REFERENCE TO RELATED APPLICATIONS

This is a continuation of International Application No. PCT/CN2009/072872, filed Jul. 22, 2009, which in turn claims the priority benefit of Chinese Patent Application No. 200810117145.4 filed Jul. 24, 2008, the entire respective disclosures of which are incorporated herein by reference.

FIELD OF THE INVENTION

The present invention relates to mobile telecommunication technologies, and more particularly, to a method and a mobile management entity (MME) for obtaining bearer condition during handover of user equipment (UE).

BACKGROUND OF THE INVENTION

In long term evolution (LTE) systems, two parameters are defined for all non-guaranteed bit rate (non-GBR) bearers, one is Access Point Name-Aggregate Maximum Bit Rate (APN-AMBR) and the other is UE-Aggregate Maximum Bit Rate (UE-AMBR). The APN-AMBR is stored in a Home Subscriber Server (HSS) as subscription information, which limits the aggregate bit rate that can be expected to be provided across all Non-GBR bearers related to the same access point name (APN). Traffic exceeds the limit will be discarded. Any non-GBR hearer can utilize all APN-AMBR resources, if the other non-GBR bearers do not carry any traffic. Both Packet Data Network Gateway (PDN GW) and UE need to save the value of the APN-AMBR and perform rate shaping for hearers corresponding to both uplink (UL) and downlink (DL) traffic.

HSS also stores a subscribed UE-AMBR. The UE-AMBR limits AMBR provided by the network for all non-GBR bearers of a UE. Traffic exceeds the limit will be discarded. Any non-GBR bearer can utilize all UE-AMBR resources, if the other non-GBR bearers do not carry any traffic. Rate control nodes, the DL and UL bearers of which are based on the UE-AMBR are located in a base station (eNB), so the eNB has to store the value of UE-AMBR. The value used by the eNB for practical scheduling is dynamically provided by the MME. The MME compares the sum of APN-AMBR of all activated APNs with the subscribed UE-AMBR, and provides the eNB with the smaller one of the two values as to-be-used UE-AMBR.

When a UE is handed over between different eNBs, the MME may not change (X2 handover), or may change (S1 handover). In a handover prepare procedure, the UE-AMBR is sent to a target eNB by a source eNB during an X2 handover or by a target MME during an S1 handover. The value of the UE-AMBR sent in the handover prepare procedure is generated based on conditions of bearer connections established between the UE and the source eNB. During the handover, however, the target eNB may only accept part of the bearers and reserve resources for these bearers, and part of the bearers the resources of which are not reserved will not be established at the target side during the handover, thus the bearer connections between the UE and the target side may suffer a change. If the target eNB still performs scheduling by using the same UE-AMBR with the source side, the scheduling may be inaccurate and may adversely impact transmission performances of the network.

SUMMARY OF THE INVENTION

Therefore, an objective of the present invention is to provide a method and an MME for obtaining bearer condition during handover of UE, so that the target side can obtain condition of bearers which are actually accepted and thus can perform resource scheduling based on practical connection condition.

Embodiments of the present invention provide a method for obtaining bearer condition during handover of UE, including the following steps:

receiving, by a mobile management entity (MME), information of at least one bearer allowed to be accepted by a target base station (eNB) when the eNB makes an admission control for a UE based on received bearer information of the UE during handover of the UE;

updating, by the MME, a UE-Aggregate Maximum Bit Rate (UE-AMBR) used by the target eNB based on the received at least one bearer.

Embodiments of the present invention also provide an MME, including:

a receiving module, adapted to receive an identity of at least one bearer allowed to be accepted by a target base station (eNB) when the eNB makes an admission control for a UE based on received bearer information of the UE during handover of the UE;

an updating module, adapted to update a UE-AMBR used by the target eNB according to the identity of the at least one bearer received by the receiving module;

a notifying module, adapted to notify the target eNB of the updated UE-AMBR obtained by the updating module.

It can be seen from the above technical scheme that during the handover, the MME can use information of bearers accepted by the target eNB to obtain a UE-AMBR corresponding to the bearer connection condition of the target eNB after the handover, and then update the UE-AMBR of the target eNB according to the obtained UE-AMBR, so that the target eNB can perform resource scheduling based on the UE-AMBR which represents practical condition of bearer connections.

BRIEF DESCRIPTION OF THE DRAWINGS

The embodiments of this invention are hereinafter described in detail with reference to the accompanying drawings so as to make the above characters and merits thereof more clear for those skilled in the art, wherein.

DETAILED DESCRIPTION OF THE INVENTION

The present invention is hereinafter further described in detail with reference to the accompanying drawings as well as embodiments so as to make the objective, technical solution and merits thereof clearer.

During handover of UE, an MME can obtain bearer information allowed to be accepted by a target eNB, and then update UE-AMBR used by the target eNB based on the information. Preferably, the MME may determine whether all APNs activated when the UE is connected to a source eNB have respective bearer connections maintained when the UE is connected to the target eNB after the handover. Then the MME may determine whether it is necessary to modify the UE-AMBR used by the target eNB. If only some of the bearer connections are accepted, the UE-AMBR needs to be modified. The judging process may also be omitted, and the UE-AMBR is directly updated based on the bearer(s) accepted by the target eNB.

In different handover procedures, the time and manner of the MME obtaining the information of bearers allowed to be accepted by the target eNB may be different. The present invention is hereinafter described in detail with reference to the embodiments to further clarify the objects, technical schemes and merits of the present invention. In the first embodiment, UE-AMBR is updated during an X2 handover.

Figure 1:
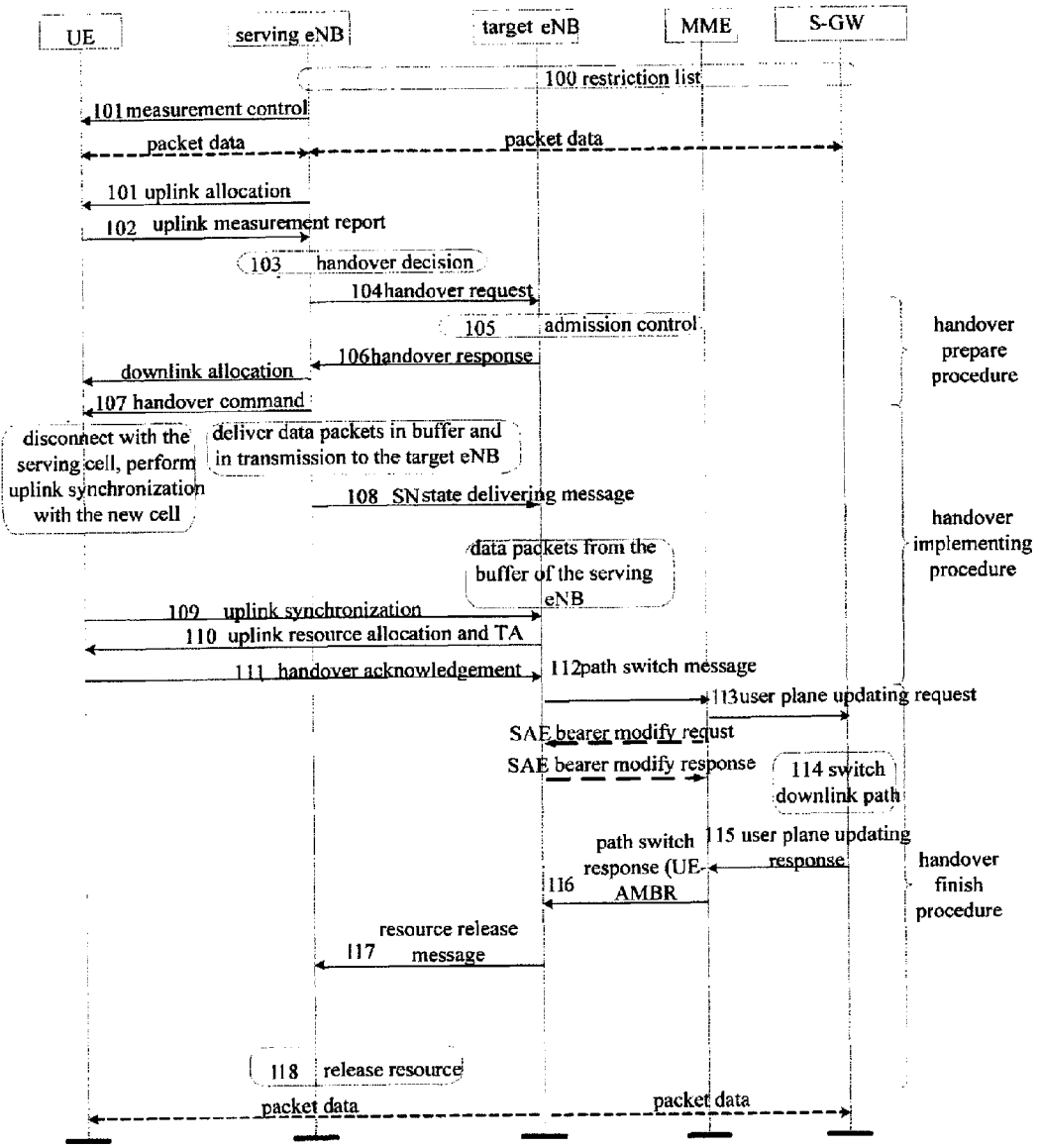
FIG. 1 is a flowchart illustrating a process for updating UE-AMBR during an X2 handover in accordance with a first embodiment of the present invention.

During the X2 handover, the MME is unchanged, and in this case the processing flow is as shown in FIG. 1, which includes the steps as follows.

In step 100, a source eNB obtains handover restriction list of UE from an MME via an attach process or via a Tracking Area Updating (TAU) process, and stores the handover restriction list in UE context of the eNB.

In step 101, the source cNB configures a measuring process for the UE according to the restriction list.

In step 102, the UE initiates an uplink measurement report.

In step 103, the source eNB performs a handover decision based on measurement information reported by the UE and a Radio resource management (RRM) algorithm In step 104, the source eNB sends a handover request to a target eNB, requesting the target eNB to reserve resources for the UE, and delivers the UE context stored in the source eNB to the target eNB.

The handover request includes an identity of an X2 signaling connection, an identity of a target cell, UE bearer information in the source eNB, RRM context, the handover restriction list, UE history information, and so on. Functions of the contents are well-known in the art, and will not be described further herein.

In step 105, the target eNB performs an admission control to determine accepted bearers based on the UE bearer information received.

In step 106, the target eNB reserves resources for the UE and then returns a handover request acknowledgement which includes information of bearers allowed to be handed over, a Tunnel Endpoint ID (TEID) allocated for data forwarding, and information to be delivered to the UE by the source eNB.

In step 107, the source eNB sends a handover command to the UE.

In step 108, the source eNB sends a sequence number (SN) status delivering message to the target eNB, informing the target eNB of reception state of uplink data and transmission status of downlink data in the source eNB.

In step 109, the UE receives the handover command, then disconnects with the source eNB, and performs uplink synchronization with the target eNB.

In step 110, the target eNB informs the UE of uplink resource allocation and timing advance (TA).

In step 111, the UE completes synchronization with the target cell, and sends a handover acknowledgement to the target eNB.

In step 112, after the handover is completed, the target eNB sends a path switch message to the MME, and the path switch message includes an identity of each bearer successfully accepted by the target eNB during the handover. Bearers not included in the message are implicitly released by the target eNB.

In steps 113 to 115, the MME sends a user plane update request to a service gateway (S-GW), the S-GW updates downlink path of the UE, and returns a user plane update response to the MME.

Meanwhile, after receiving the path switch message, the MME determines whether all APNs activated when the UE is connected to the source eNB have respective bearer connections maintained when the UE is connected to the target eNB after the handover. If all APNs have respective bearer connections maintained by the target eNB after the handover, the MME determines there is no need to modify the UE-AMBR; otherwise, the MME modifies the UE-AMBR used in the target eNB based on condition of bearer connections of the target eNB after the handover.

In step 116, the MME sends a path switch response to the target eNB, and the path switch response includes the updated value of the UE-AMBR. After receiving the UE-AMBR, the target eNB performs resource scheduling for the non-GBR bearers according to the new value until another updated value of the UE-AMBR is received.

In steps 117 to 118, after the path update is completed, the target eNB instructs the source eNB to release the UE context and resources allocated to the UE at the source side.

In the above step 116, the MME loads the updated UE-AMBR into a conventional path switch response message. In addition, the MME may also notify the target eNB of the updated UE-AMBR via dedicated signaling. For example, after receiving the path switch message, the MME initiates a System Architecture Evolution (SAE) bearer modify procedure, loads the updated UE-AMBR into an SAE bearer modify request to inform the target eNB of the updated UE-AMBR; or, the MME may loads the updated UE-AMBR into a UE context modify request to inform the target eNB of the updated UE-AMBR. The dedicated signaling procedure is an alternative to the piggyback process, i.e., if the MME informs the target eNB via the dedicated SAE bearer modify procedure or the UE context modify procedure, the updated value of the UE-AMBR will not be piggybacked in the path switch response in step 116.

In the second embodiment, UE-AMBR is updated during an S1 handover.

Figure 2:
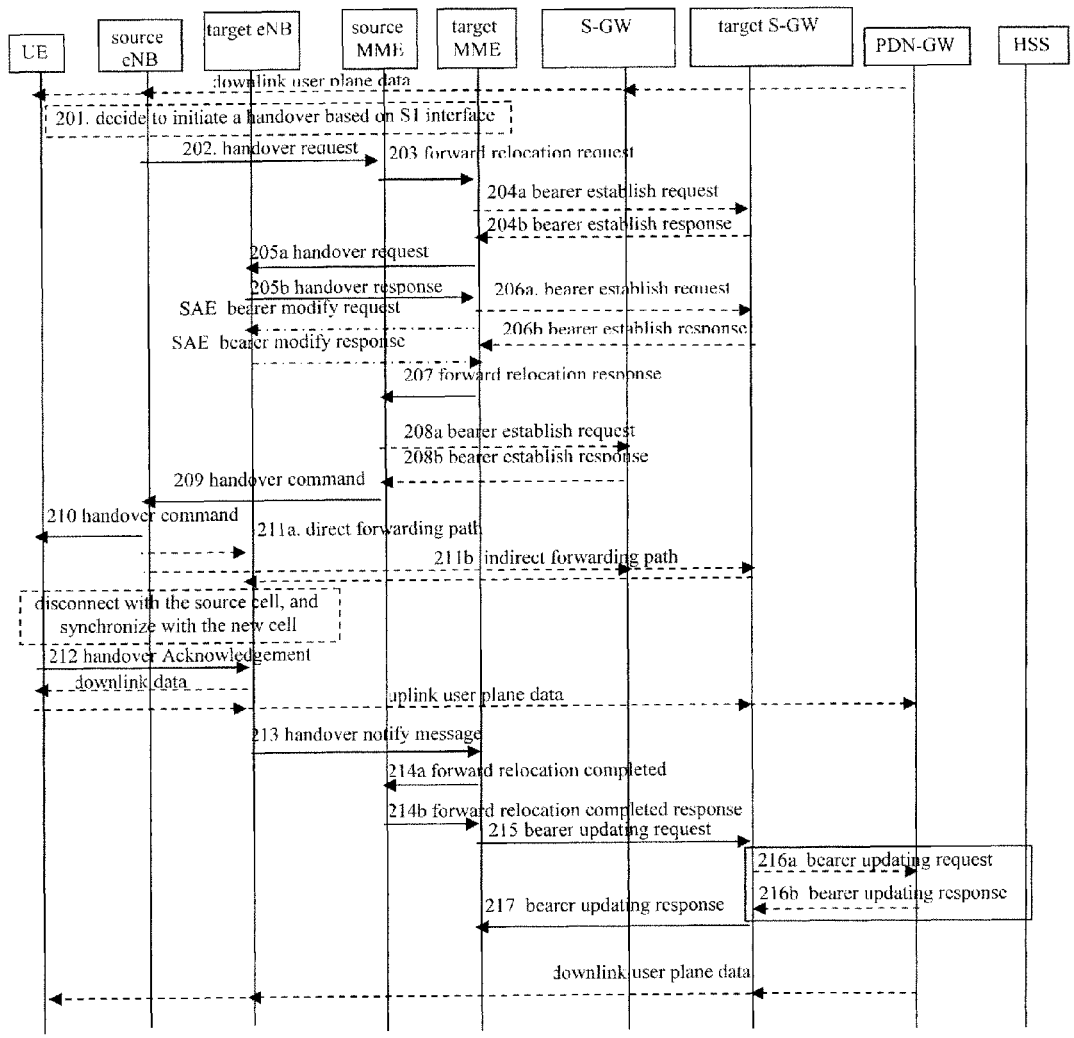
FIG. 2 is a flowchart illustrating a process for updating UE-AMBR during an S1 handover in accordance with a second embodiment of the present invention.

A change of MMEs will occur during an S1 handover, i.e., there is a switch from a source MME to a target MME. The process is as shown in FIG. 2, which includes the steps as follows.

In steps 201 to 203, a source eNB decides to initiate a handover. The source eNB first determines whether the handover can be implemented via an X2 interface, if the handover can not be implemented via an X2 interface, the source eNB sends a handover request to a source MME to initiate a handover procedure based on an S1 interface. The source MME selects a target MME, and sends an MME UE context as a forward relocation request to the target MME. The MME UE context includes information of bearers related to a PDN GW and a S-GW. The target MME obtains all APNs activated when the UE is connected to the source eNB from the forward relocation request.

In step 204, the target MME selects a target S-GW, and establishes a user plane for all bearers transferred to the target MME. Step 204 is performed only when the S-GW is relocated.

Step 204 includes a sub step 204a where the target MME sends a bearer establishing request to the target S-GW, and a sub step 204b where the target S-GW returns a bearer establishing response to the target MME. If the S-GW does not change through the handover, the step 204 can be omitted.

In step 205, the target MME requires the target eNB to establish a UE context which includes information of bearers to be established.

In sub step 205a, the target MME sends a handover request to the target eNB, and the handover request includes the information of bearers to be established. In sub step 205b, the target eNB makes a bearer admission control, and returns a handover response to the target MME. The handover response includes an identity of each bearer allowed to be accepted by the target eNB.

After sub step 205b, the target MME obtains the identity of each bearer allowed to be accepted by the target eNB. After this step, the target MME determines whether all APNs activated when the UE is connected to the source eNB have respective bearer connections maintained when the UE is connected to the target eNB after the handover based on the identity of each bearer allowed to be accepted by the target eNB. If all APNs have respective bearer connections maintained when the UE is connected to the target eNB after the handover, the target MME determines there is no need to modify the UE-AMBR; otherwise, the target MME modifies the UE-AMBR used in the target eNB based on condition of bearer connections of the target eNB after the handover, initiates a SAE bearer modify procedure or a UE context modify procedure, and informs the target eNB of the updated value of the UE-AMBR via dedicated signaling. After receiving the dedicated signaling, the target eNB uses the new value of the UE-AMBR for resource scheduling until another updated value of the UE-AMBR is received.

In step 206, the target MME establishes forwarding parameters at the target S-GW when direct forwarding is adopted.

In step 207, a response to the forward relocation request is sent. This step may also include transmitting address information of a forwarding tunnel when indirect forwarding is adopted.

In step 208, when indirect forwarding is adopted, a TEID used for forwarding by the target S-GW is delivered to the serving S-GW.

In step 209, the source eNB is informed that preparation for the handover is completed and that the source eNB can instruct the UE to perform handover. The source eNB is also informed of forwarding tunnel address parameters, and the forwarding tunnel is established. The source eNB informs the UE at step 210 that the UE can switch the access network.

Sub steps 211a and 211b respectively represent data forwarding paths in direct forwarding and indirect forwarding.

In steps 212 to 213, the UE sends a handover acknowledge to the target eNB after accessing a target accessing system and being allocated a unique identity; the target eNB sends a handover notify message to the target MME.

In step 214, the target MME informs the source MME that the UE has successfully accessed the target accessing system. The source MME starts a timer for monitoring the time of releasing resources in the source system.

In steps 215 to 217, the target MME sends tunnel address information allocated by the target eNB for the bearers to the S-GW, and establishes a downlink transmission tunnel between the UE and the PDN-GW. If the S-GW is relocated, the bearers between the S-GW and the PDN-GW are updated in step 216.

At any time after step 212 is performed, the UE may initiates a TAU procedure to update location information in the HSS. This process is irrelevant to the technical scheme of the present invention, thus will not be described further herein.

Figure 3:
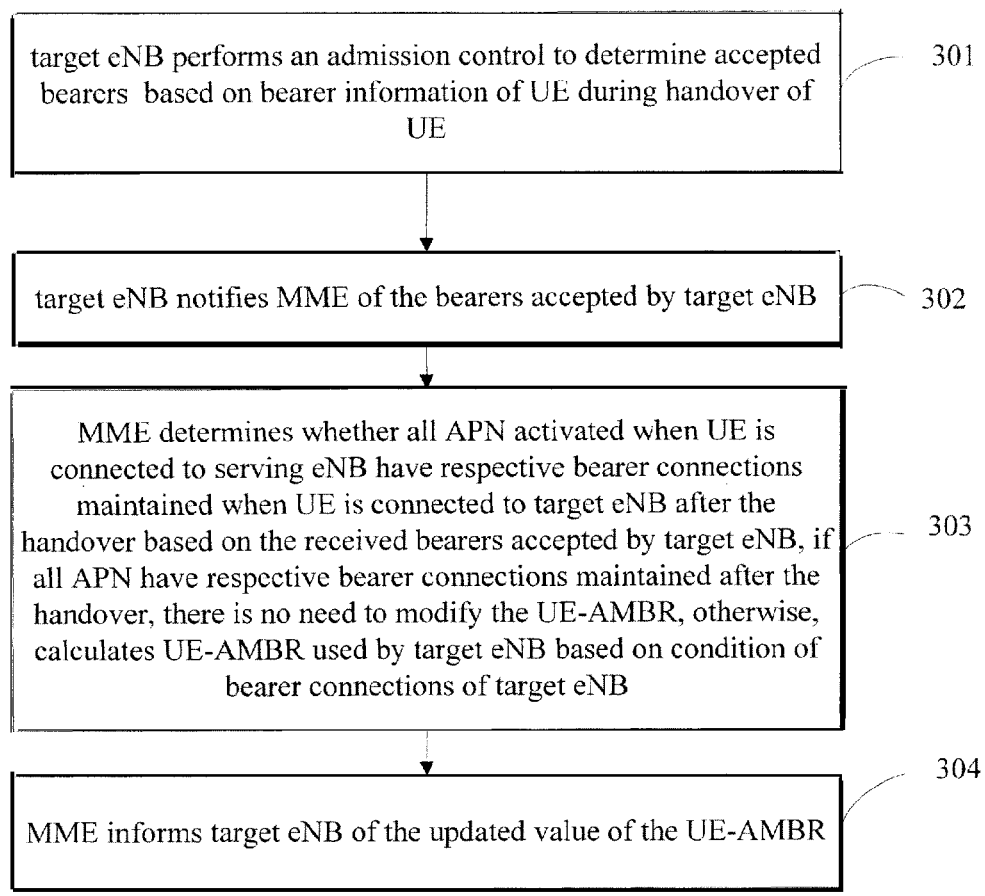
FIG. 3 is a flowchart illustrating a process for updating UE-AMBR in accordance with an embodiment of the present invention.

From the above embodiments it can be seen that, although the S1 handover and the X2 handover have different detailed procedures, the UE-AMBR updating procedures provided by embodiments of the present invention all include the following fundamental steps shown in FIG. 3.

In step 301, a target eNB performs an admission control to determine accepted bearers based on UE bearer information received during handover of a UE.

In this embodiment, it is supposed that more than one bearer is allowed to be accepted by the target eNB.

In step 302, the target eNB informs an MME of the accepted bearers.

In step 303, the MME determines whether all APNs activated when the UE is connected to a source eNB have respective bearers maintained when the UE is connected to the target eNB after the handover according to the received bearers accepted by the target eNB, if all APNs have respective bearers maintained after the handover, the MME determines there is no need to modify the UE-AMBR; otherwise, the MME calculates a UE-AMBR used by the target eNB based on bearer connection condition of the target eNB after the handover.

In step 304, the MME informs the target eNB of the updated value of the UE-AMBR.

Figure 4:
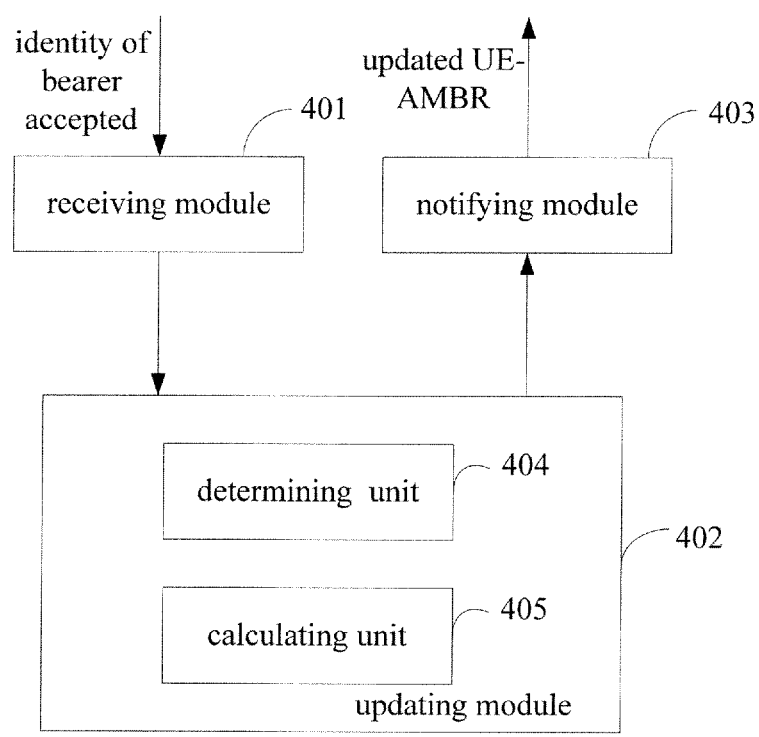
FIG. 4 is a block diagram illustrating a structure of an MME in accordance with an embodiment of the present invention.

The third embodiment of the present invention provides an MME which is adapted to update UE-AMBR during handover of UE. FIG. 4 is a block diagram of a structure of the MME, where modules irrelevant to the scheme of the present invention are not omitted.

The MME includes:

a receiving module 401, adapted to receive an identity of at least one bearer allowed to be accepted by a target eNB;

an updating module 402, adapted to updated a UE-AMBR used by the target eNB according to the identity of the at least one bearer allowed to be accepted received by the receiving module 401;

a notifying module 403, adapted to notify the target eNB of the UE-AMBR updated obtained by the updating module 402.

The updating module 402 may include:

a determining unit 404, adapted to determine whether all APNs activated when the UE is connected to a source eNB have respective bearers maintained when the UE is connected to the target eNB after the handover according to the identity of the at least one bearer allowed to be accepted, if not all APNs have respective bearers maintained after the handover, send an indication signal;

a calculating unit 405, adapted to calculate a UE-AMBR used by the target eNB based on bearer connection condition of the target eNB after the handover after receiving the indication signal sent by the judging unit 404, obtain an updated UE-AMBR.

The foregoing is only preferred embodiments of this invention, and is not for use in limiting the invention. Any modification, equivalent replacement or improvement made under the spirit and principles of this invention should be covered within the protection scope of this invention.

The invention claimed is:

1. A method for obtaining bearer condition during handover of user equipment (UE), comprising:
receiving, by a mobile management entity (MME), information of at least one bearer allowed to be accepted by a target base station (eNB) when the eNB makes an admission control for a UE based on received bearer information of the UE during handover of the UE; and determining, by the MME, whether all access point names (APN) activated when the UE is connected to a source eNB have respective bearer connections maintained when the UE is connected to the target eNB after the handover based on the received at least one bearer; if all APNs have respective bearer connections maintained after the handover, determining there is no need to modify a UE-Aggregate Maximum Bit Rate (UE-AMBR) used by the target eNB; if not all APNs have respective bearer connections maintained after the handover, modifying the UE-AMBR used by the target eNB based on bearer connection condition of the target eNB after the handover, and informing the target eNB of a updated value of the UE-AMBR.

2. The method of claim 1, wherein the handover of the UE is an X2 handover during which the MME is not changed.

3. The method of claim 2, wherein receiving by the MME information of at least one bearer allowed to be accepted by the eNB comprises receiving, by the MME, a path switch message carrying an identity of each bearer successfully accepted by the target eNB through the handover; and wherein informing by the MME the target eNB of the updated value of the UE-AMBR comprises sending, by the MME to the target eNB, a path switch response carrying the updated value of the UE-AMBR.

4. The method of claim 3, wherein informing by the MME the target eNB of the updated value of the UE-AMBR comprises: informing, by the MME, the target eNB of the updated value of the UE-AMBR through dedicated signaling.

5. The method of claim 4, wherein the dedicated signaling is a System Architecture Evolution (SAE) bearer modify request or a UE context modify request.

6. The method of claim 1, wherein the handover of the UE is an S1 handover during which the MME changes.

7. The method of claim 6, wherein receiving by the MME information of at least one bearer allowed to be accepted by the eNB comprises receiving, by the MME, a handover response carrying an identity of each bearer accepted by the target eNB; and wherein informing by the MME the target eNB of the updated value of the UE-AMBR comprises initiating, by the MME, an SAE bearer modify procedure or a UE context modify procedure, and informing the target eNB of the updated value of the UE-AMBR via dedicated signaling.

8. The method of claim 2, further comprising:

after informing the target eNB of the updated value of the UE-AMBR, substituting, by the target eNB, a value of a UE-AMBR stored in the target eNB with the received updated value of the UE-AMBR, and performing resource scheduling for non-guaranteed bit rate (non-GBR) based on the updated value of the UE-AMBR.

* * * * *